(12) United States Patent
Whitehouse et al.

(10) Patent No.: US 6,521,280 B1
(45) Date of Patent: Feb. 18, 2003

(54) FORMING OF FROZEN FOODSTUFFS

(75) Inventors: John Arthur Whitehouse, deceased, late of Norfolk (GB), by Susan Whitehouse, Executirx; Richard John Hawes, Norfolk (GB)

(73) Assignee: AEW International Limited, Norwich (GB)

( * ) Notice: Subject to any disclaimer, the term of this patent is extended or adjusted under 35 U.S.C. 154(b) by 0 days.

(21) Appl. No.: 09/701,728

(22) PCT Filed: Mar. 30, 2000

(86) PCT No.: PCT/GB00/01209

§ 371 (c)(1),
(2), (4) Date: Nov. 30, 2000

(87) PCT Pub. No.: WO00/57732

PCT Pub. Date: Oct. 5, 2000

(30) Foreign Application Priority Data

Mar. 31, 1999 (GB) ............................................. 9907385

(51) Int. Cl.[7] .................................................. A23P 1/00
(52) U.S. Cl. ........................................ 426/513; 426/518
(58) Field of Search ................................ 426/512, 513, 426/518, 524

(56) References Cited

U.S. PATENT DOCUMENTS 4,474,823 A * 10/1984 Nishikawa et al. ......... 426/513
6,210,733 B1 * 4/2001 Rosenberger ............... 426/513

FOREIGN PATENT DOCUMENTS

DE 19733855 A * 11/1998
FR 2145730 * 2/1973
GB 2280869 A * 2/1995

* cited by examiner

Primary Examiner—George C. Yeung
(74) Attorney, Agent, or Firm—Lee, Mann, Smith, McWilliams, Sweeney & Ohlson

(57) ABSTRACT

Apparatus is described for shaping similar sized rectilinear portions of frozen food stuff comprising: a magazine for receiving accurately dimensioned planks of frozen food stuff, a device for dispensing planks from the magazine one at a time, guillotine blades for severing portions of equal size from the leading end of each displaced plank, and a placement device adapted to transfer each portion onto a lower tooling part of relatively displaceable two-part tooling. A drive mechanism is provided for forcibly lowering an upper tooling part towards the lower part so as to trap the portion in the cavity formed when the two tooling parts come together, to cause the portion to spread out within the cavity and adopt the internal shape thereof. The drive mechanism also raises the upper tooling part to leave the shaped portion on the lower tooling part. The advance of placement device to position the next portion to be shaped on the tooling serves to push the previously shaped portion ahead of it beyond the tooling and onto a portion transfer and collection device. In accordance with the invention the guillotine blades are adjustable to alter the size of the portions, so that the volume of each portion bears a fixed relationship to the volume of the tooling cavity. For undamaged shaping the portion volume should be not greater than, and preferably just less than the cavity volume.

13 Claims, 4 Drawing Sheets

FORMING OF FROZEN FOODSTUFFS

FIELD OF INVENTION

This invention concerns the forming of blocks of frozen foodstuff into shaped portions which correspond in appearance to the typical presentation of a cut or fillet of the original foodstuff.

BACKGROUND TO THE INVENTION

Where filleted fish is frozen en masse in a plate freezer on a trawler and delivered as a block of frozen fish in ice to a food processor, it is known to divide up the block into small briquettes of frozen fish and to then form the briquettes into a shape corresponding to a fish fillet. This saves defrosting the block, separating the individual fillets and re-freezing them, which is not only time and energy consuming, but can spoil the foodstuff.

Blocks of frozen chicken fillets can be formed and handled in the same way.

Blocks of frozen fillets en masse as described will be referred to as frozen consolidated foodstuff.

It will be appreciated that whereas individual fillets of fish or chicken can vary in size, by carving up a solid mass of filleted fish or chicken and forming briquettes which are virtually 100% "meat", and then re-forming the briquette into a fillet shape, will produce uniform size and volume pieces of foodstuff, which is ideal for packaging and retailing.

The essential difference between a formed briquette and a frozen individual fillet, is that the briquette may contain "meat" from two or more fillets from the original block of filleted material, but the separate portions of meat tend to become bonded by the forming process. In practice, it has been found that consumers hardly notice any difference between a "reconstituted fillet" and an original fillet. This is particularly so where the filleted material is coated with a rich sauce or is covered by breadcrumbs or other coating.

It has been known for many years that the texture and bite to the foodstuff after forming from frozen briquettes can be affected if excessive pressure is applied to the material to form the briquette into the desired end product shape.

With this in mind it is an object of the present invention to provide an improved method of forming briquettes of frozen consolidated foodstuff material as aforesaid to produce shaped portions corresponding to fillets or cuts or meat or fish which would normally be obtained by cutting or filleting a fresh fish or fresh chicken joint.

SUMMARY OF THE INVENTION

According to the present invention a large block of frozen consolidated foodstuff is cut into a plurality of small briquettes the volume of each of which is carefully controlled so as to bear a particular relation to the volume of a cavity in tooling which is formed when two parts of the tooling are brought together under pressure, and into which the briquette is to be placed to form it into a final shape.

The tooling may be two part tooling with part of the internal cavity formed by a cut-away region in both of two opposed generally flat faces of the two tooling parts.

Alternatively the cavity may be formed by a cut-away region in the flat face of one tooling part as this is moved into contact with a generally flat surface of the other tooling part making up the two part tooling.

The cutting of the block is preferably undertaken using a guillotine but where the initial block is too large to be cut by a guillotine, a bandsaw or other cutting device may be employed so as to reduce the initial block size into sections which subsequently can be cut using a guillotine.

This is to advantage since guillotining results in very little waste material in the form of "sawdust" which, although it can be recovered and reconstituted into a paste for filling cavities in forming tooling, the resulting product after cooking has the texture and bite which is very different from that of the actual fish or chicken.

By selecting the position of the cuts, so the size of briquettes formed from the large mass of frozen foodstuff can be controlled by reference to their volume and since the position of the cuts can be selected at will, the actual volume of each briquette so cut from the block can be controlled very accurately.

The selection of the actual volume of each briquette is governed by a number of factors.

For some applications, the quality of the final foodstuff may be of paramount importance. In that event the volume of each briquette is selected so as to be just less than the volume of the cavity when the tooling is closed. Typically a volume equivalent to 95% of the cavity volume is chosen. However it is to be understood that this is merely illustrative of the undersize volume of product and undersize volumes in the range 90–99% can be considered.

It is to be understood that the smaller or greater the discrepancy between the volume of the briquette and the volume of the cavity when the tooling is closed, so the final shape of the formed briquette will more or less correspond precisely to the internal shape of the cavity. Thus with a 97% volume fill factor, a very good approximation to the desired final shape and configuration of the formed briquette will be achieved, whereas with a 91% or 92% volume fill factor, the external appearance of the formed briquette could be less than perfect.

If the appearance of the final product is of importance, then the volume of the briquette should equal the volume of the cavity.

However if the actual appearance of the final product is of paramount importance, and texture and bite is deemed of secondary importance, then it may be preferred to cut the briquettes from the block of frozen consolidated material so that they are very slightly over-size in terms of volume, relative to the actual volume of the cavity, and to accept the marginal crushing of the material when the tooling closes.

Typically over-size volume lies in the range 100% to 105% of the cavity volume.

In a 105% overfill situation this excess material will tend to be crushed during the final of the tooling, and it is this crushing which can alter the bite and texture of the final product when cooked and eaten.

In order to accommodate excess material, the tooling may include a displaceable section or an opening in for example an end region thereof which is left open so that material can flow into that space under the pressure exerted on the briquette during the forming process.

The invention thus provides a method of cutting a block of material into briquettes which when formed under pressure in a mould tool, will produce either damage-free product but possibly imperfectly shaped product at one end of the spectrum, damage-free and perfectly shaped product if 100% fill factor is employed and perfectly shaped but marginally inferior product as regards texture and bite if over-size briquettes are cut from the block.

The invention thus envisages accurate dimensioning of a block of frozen consolidated product and the accurate cutting from the block of briquettes of the frozen foodstuff, each having an identical volume which is determined by reference to the cavity volume of the forming tooling when the tooling parts are closed so as to ensure that the final product when released from the tooling is either damage free and perfectly formed, or damage free and possibly imperfectly formed, or perfectly formed and subject to marginal texture damage as a result of crushing forces within the forming process.

The process includes the step of determining the volume of the tooling when closed by for example pouring in a thermo-setting compound such as wax, and determining the volume of the latter which just fills the volume of the cavity.

Since the tooling may be left in place for producing large numbers of similar product pieces, it is in general only necessary to perform the volume measuring step once, and for this volume to then be stored for the tooling concerned.

When tooling is changed or a different part of multiple chamber tooling is used, it is only necessary to call up the stored volume for the appropriate tooling or tooling chamber, and use that in the computation of the cutting programme for a block of frozen foodstuff material which is to be cut up prior to being formed.

The cutting process may be automated by sensing the dimensions of the block of frozen foodstuff and entering the dimensions into a computer having stored therein the desired volume for each briquette to be cut from the block, and programme the computer to determine the position and nature of the different cuts to be made from the block to secure the desired briquette volumes.

Where a block cannot be cut up exactly, the computer is preferably programmed so as to leave appropriately cross-sectioned briquettes of inadequate length which can then be collected and aligned end to end to form a continuous length of material which can then be guillotined into correct length briquettes for feeding into the tooling.

The invention will now be described by way of example, with reference to the accompanying drawings, in which.

Figure 1:
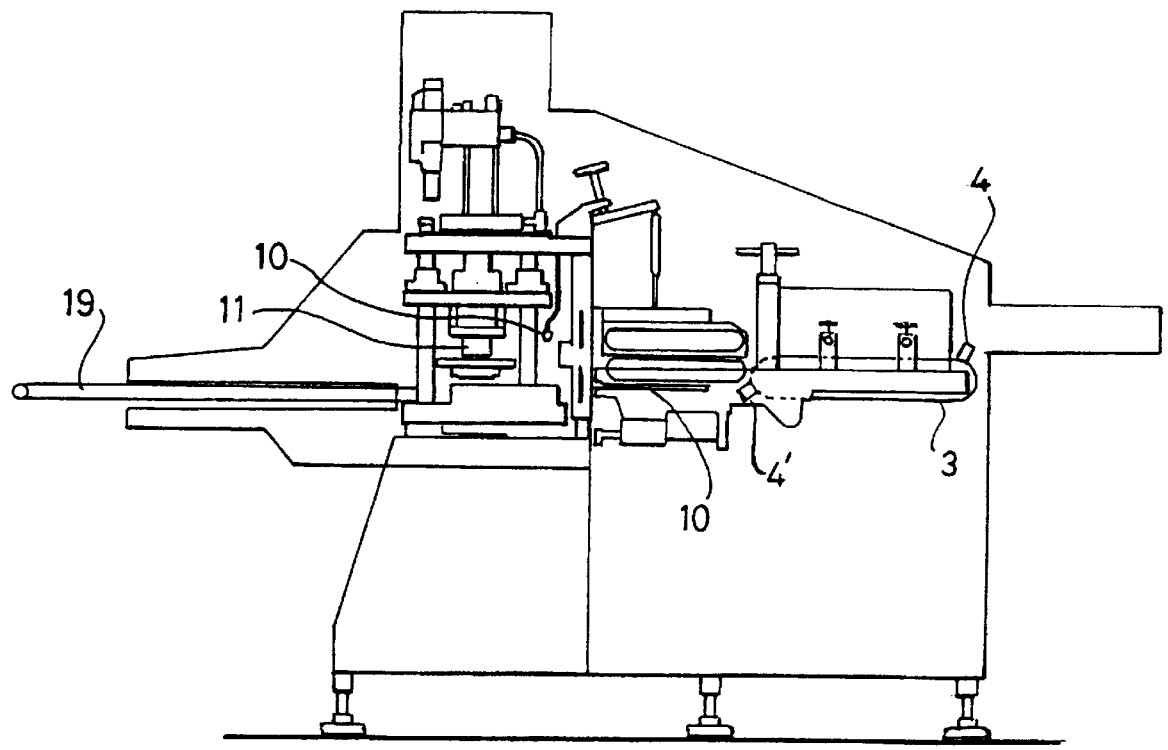
FIG. 1 is a general side elevation of a frozen foodstuff shaping machine, incorporating two part tooling for receiving and shaping uniformly sized portions of frozen foodstuff.
Figure 2:
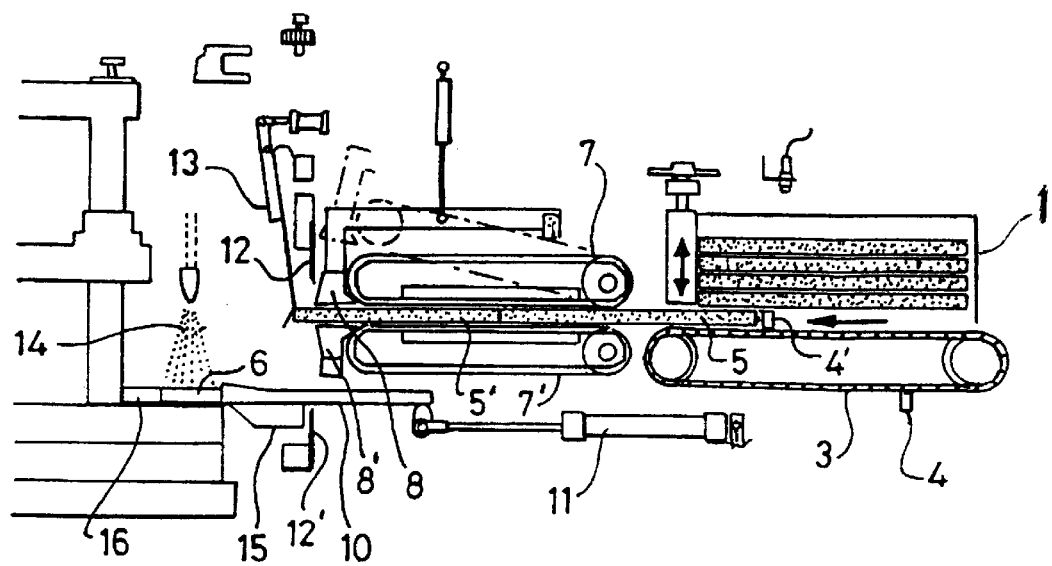
FIG. 2 is a similar view to a larger scale of the feed mechanism for moving planks into a position in which they can be guillotined into rectilinear portions.

FIGS. 1 and 2 are best viewed together. They show a stack of planks of frozen fish in a plank magazine 1 which are loaded from above and retrieved one at a time from the bottom of the stack by a pusher (or flight) 4 carried by an endless conveyor 3. The latter causes the flight 4 to engage the rear edge of the lowermost plank 5 and push it in the direction of the arrow in FIG. 2 to engage the rear edge of the preceding plank 5' (see FIG. 2) pushed out by the other flight 4'. Food conveyors 7, 7' sandwich the planks and advance them for guillotining.

After the leading end of the preceding plank 5' extends between two guillotine blades 12, 12' and the sprung feeler arm 13 has been sufficiently displaced, the guillotine is operated to sever the protruding end and cause the severed portion to end up on a platform 15 from which it is displaced, to the left by pusher plate 10 driven by a cylinder 11, after 15 has been lowered.

Just prior to guillotining two clear edges 8, 5' are moved down and up so as to clamp the leading end and close to where the cut is to be made. The leading edge of the plank also engages and displaces a feeler arm 13 movement of which can generate an electrical signal indicating the advancement of the plank.

The severed portion 6 passes below a water spray 14 before arriving at the entrance to the shaping station.

Figure 3A:
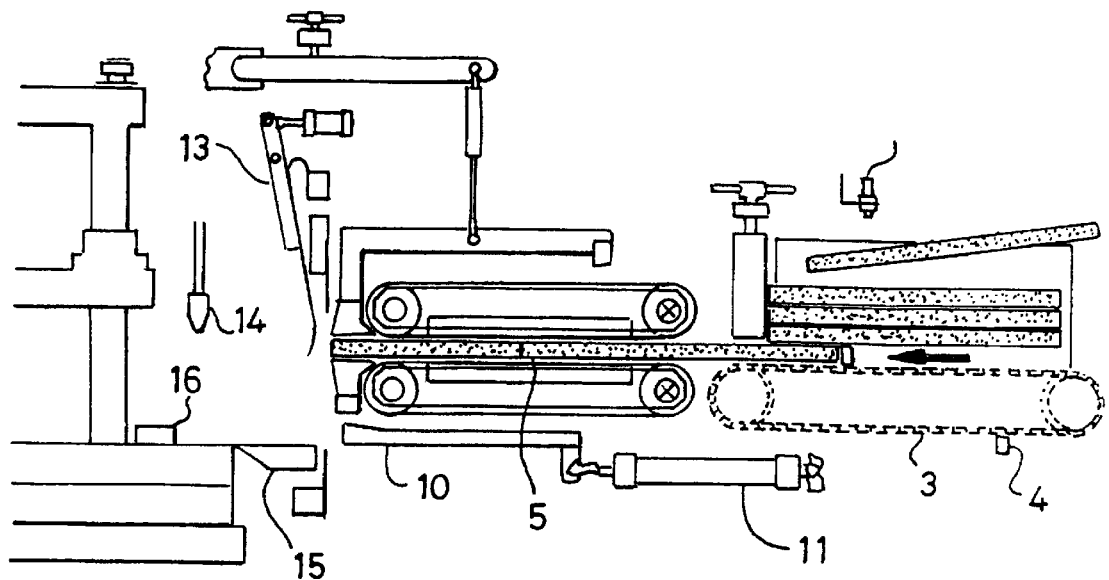
FIGS. 3a and 3b illustrate the movement of a plank into the guillotining position.
Figure 3B:
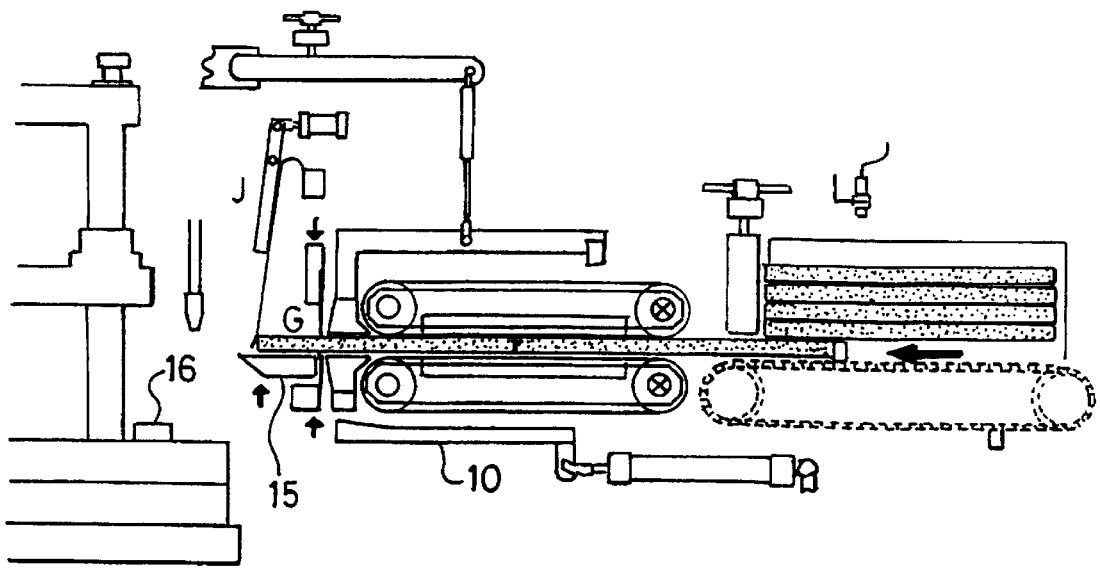

FIGS. 3a and 3b show the plank severing and transfer sequence more clearly. The same reference numerals are employed throughout. As shown in FIG. 3b, the platform 15 is adapted to be moved up from the position occupied in FIG. 3a to abut the underside of the protruding plank end, during guillotining, after which it is lowered with the severed portion thereon for displacement by pusher 10.

Figure 4:
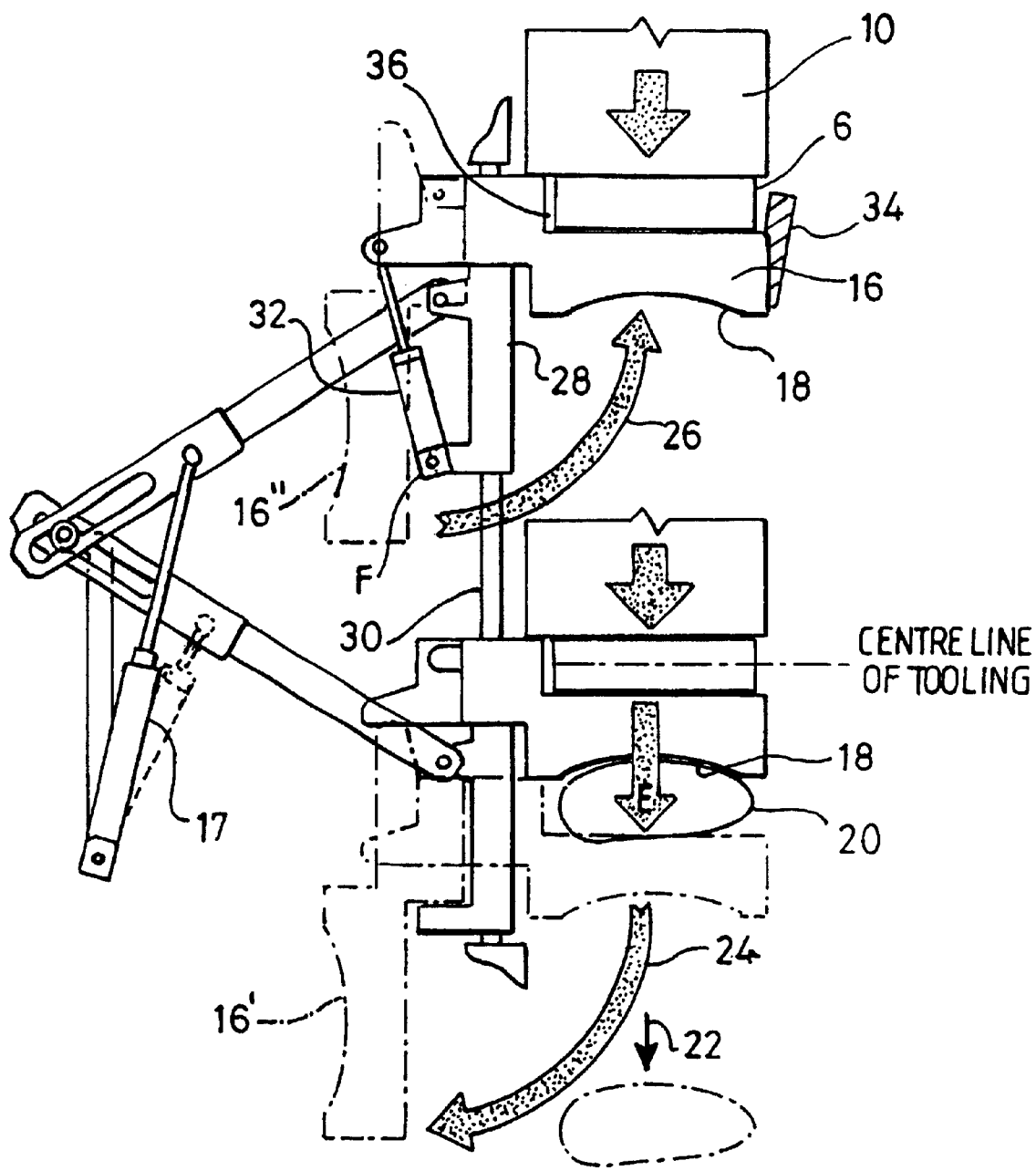
FIG. 4 is a plan view of the portion feed and placement mechanism by which a guillotined portion is moved beneath the shaping tooling and thereafter the shaped portion is moved away to make way for the next rectilinear portion to be placed for shaping.
Figure 5A:
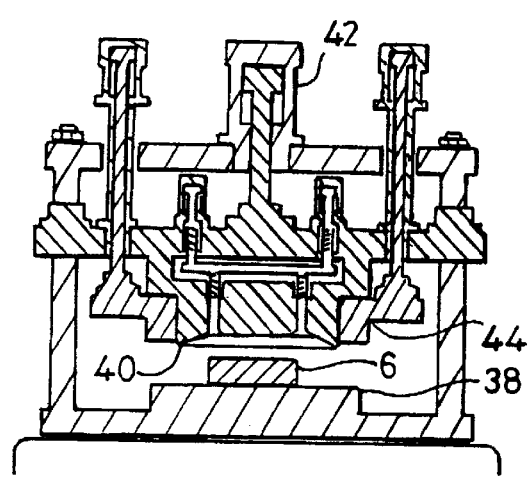
FIGS. 5a to 5e illustrate the forming part of the machine and illustrate the sequence of events by which a rectilinear portion is formed into a fillet shaped portion.
Figure 5B:
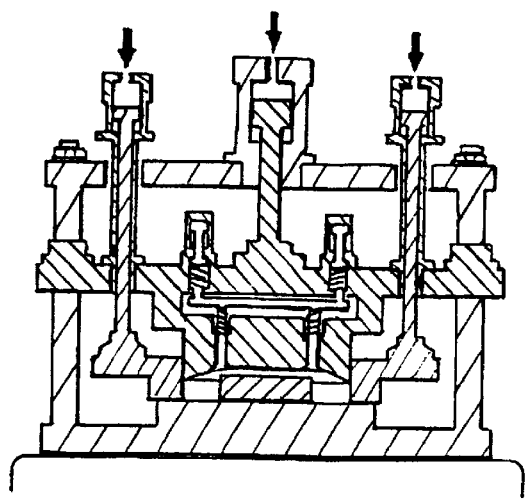
Figure 5C:
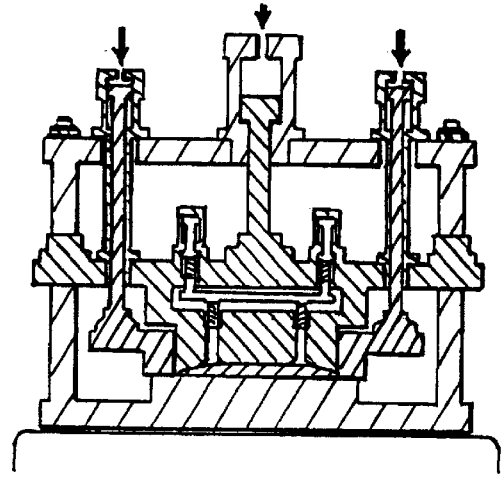
Figure 5D:
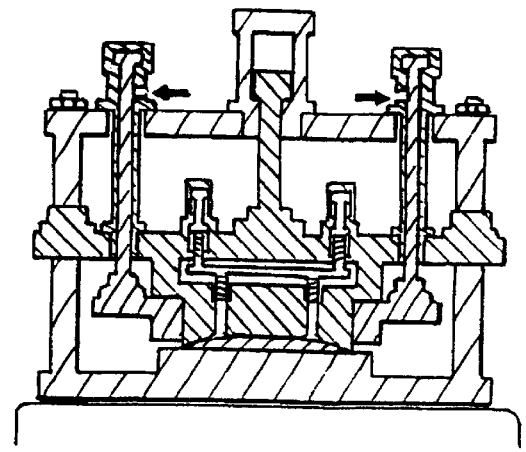
Figure 5E:
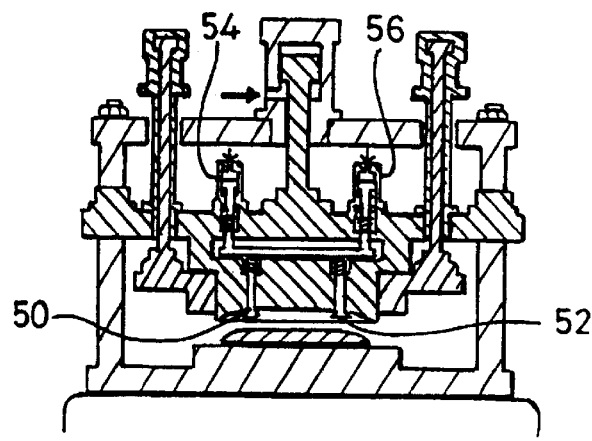

The plan view of FIG. 4 shows how the severed portion 6 is accurately located below the tooling, the centre line of which is denoted in FIG. 4.

On arrival at the shaping station, movement of the portion 6 is prevented by a control arm 16 forming part of an indexing escapement, the operation of which is synchronised with the operation of the tooling. At the appropriate time, forward movement of the arm 16 is permitted with the severed portion 6 located between it and the leading end of the advancing pusher 10, until the portion is accurately located on the centreline of the tooling. A resisting pressure is exerted on the continued forward movement of arm 16 at this position, by the action of cylinder 17. Continued forward movement of pusher 10 is arrested and its motion reversed to return it to its home position as shown in FIGS. 3a/3b.

The result is that the portion 6 comes to rest exactly on the centreline of the tooling.

The movement of arm 16 will have caused its leading surface 18 to have engaged the previously shaped portion 20 left on the lower part of the tooling at the end of the previous shaping operation, so that the last part of the forward movement of arm 16 is to advance the previously shaped portion onto a transfer conveyor (19 in FIG. 1) by which it is rapidly conveyed away in the direction of arrow 22 leaving the way clear for the arm 16 to swing through 90 (as denoted by arrow 24) so as to occupy the position 16'.

Operation of cylinder 17 returns the arm 16 to the position 16" from which it is swung through 90 as denoted by arrow 26 to once again occupy the start position, ready to receive the next following severed position.

To this end, the arm 16 is pivotally mounted on a carriage 28 which is slidable by cylinder 17 along a rail 30 running parallel to the movement of the pusher 10. A cylinder 32 serves to swing the arm 16 through 90 as required. A finger 34 defines a lateral guide for positioning the portion 6 against the stop 36, so that the portion 6 is located accurately relative to the tooling (not shown in FIG. 5) both parallel and perpendicular to the direction of movement of the arm 10.

FIGS. 4a to 4e are five views of the shaping station viewed from the pusher 10.

The tooling comprises a flat platform 38 onto which the severed portion 6 is slid by the pusher 10, and a vertically displaceable upper tooling portion 40 movable downwardly under the action of a double acting cylinder 42, to engage the portion 6 and shape same as tool 40 closes on 38, and upwardly to leave the shaped portion on the platform 38.

An outer tooling member 44 surrounds tool 40, and is displaceable by cylinders 46, 48 independently of tool 40, to clamp and seal against the platform 38 around the region onto which the tool 40 will bottom at the lower end of the stroke of cylinder 42. This reduces the chance of seepage under shaping pressure from below the edge of the tool 40. To this end the outer tooling 44 is arranged to bottom onto platform 38, before tool 40.

Reversing the operation of the cylinders 42, 46 and 48 raises the inner and outer tooling to leave the shaped portion on the platform 38. As this occurs, ejectors 50, 52 (see FIG. 5e) are displaced downwardly by operation of cylinders 54, 56 to eject the shaped portion from the upper tooling.

In accordance with the invention, the volume defined by the upper and lower tooling when 40 bottoms on 38, is selected so as to just correspond to the volume of portion 6 (or to be just less or just more than that volume as desrved), and the operation of the pusher 10, stop 36, guide 34 and arm 16 serves to accurately locate the severed portion relative to the tooling, especially the cavity in the upper tooling, so that part of the portion material does not become trapped and crushed between 38 and 40 on closure. By accurately positioning the portion relative to the tooling, the portion is in a position to spread substantially uniformly to occupy the cavity (formed as the tooling closes), thereby preventing damaging crushing forces on the portion material.

The volume of each portion cut by the guillotine is controllable, inter alia by adjusting the advance of each plank 5' by the upper and lower feed conveyors 7, 7' between which planks 5, 5' are sandwiched, the timing of the clamping action of two shear edges 8,8' and the distance through which 13 is moved before triggering the clamping of the shear edges 8,8' and the closing of the guillotine blade 12, 12'.

What is claimed is:

1. A method of cutting up by a cutting process a block of frozen consolidated foodstuff into a plurality of briquettes of predetermined volume and shaping the latter under pressure in two part tooling, comprising the steps of controlling the volume of each of the briquettes by the cutting process so as to bear a predetermined relation to a cavity of given volume which is formed by bringing the two parts of the tooling together under pressure, and placing the briquette into the cavity to form it into its final shape, wherein the cutting process is automated by sensing the dimensions of each block of frozen foodstuff, entering the dimensions into a computer having also stored therein the predetermined volume for each briquette to be cut from the block, and wherein the computer is programmed to determine the position and nature of the cuts to be made to the block to secure the predetermined volume of the briquettes to be cut therefrom.

2. The method as claimed in claim 1 in which the cutting of the block is undertaken using at least a guillotine.

3. The method as claim in claim 2 in which an initial cutting of the block is performed by a bandsaw.

4. The method as claimed in claim 1 in which positioning of cuts is selected so that the size of the briquettes formed from the block of frozen foodstuff is controlled by reference to the predetermined volume.

5. The method as claimed in claim 1 in which the volume of each briquette is selected so as to be just less than the volume of the cavity when the tooling is closed.

6. The method as claimed in claim 5, in which a volume equivalent to 90%–99% of the cavity volume is chosen.

7. The method as claimed in claim 1 wherein the volume of the briquette is selected so as to be equal to the volume of the cavity.

8. The method as claimed in claim 1 wherein the volume of each of the briquettes is selected so as to be slightly greater than the volume of the cavity.

9. The method as claimed in claim 8 in which the briquette volume lies in the range 100% to 105% of the cavity volume.

10. The method claimed in claim 8 in which the tooling includes a displaceable section, or an opening in an end region of the tooling through which briquette material flows under the pressure exerted on the briquette during the shaping.

11. The method as claimed in claim 1 wherein the cutting process is automated by sensing the dimensions of each block of frozen foodstuff, entering the dimensions into a computer having also stored therein the predetermined volume for each briquette to be cut from the block, and wherein the computer is programmed to determine the position and nature of the cuts to be made to the block to secure the predetermined volume for the briquettes to be cut there from.

12. A method of cutting up by a cutting process a block of frozen consolidated foodstuff into a plurality of briquettes for individually forming into shaped portions, in which each briquette has the same volume as each other briquette, comprising the steps of determining volume of each briquette by reference to cavity volume of a two part shaping tooling when the tooling parts are closed, placing each briquette for final shaping so as to ensure that the shaped portion, when released from the tooling, is damage free and perfectly formed, and wherein the cutting process is automated by sensing the dimensions of each block of frozen foodstuff, entering the dimensions into a computer having also stored therein the predetermined volume for each briquette to be cut from the block, and wherein the computer is programmed to determine the position and nature of the cuts to be made to the block to secure the predetermined volume of the briquettes to be cut therefrom.

13. The method as claimed in claim 12 applied to a block which cannot be cut up into an exact number of briquettes of the predetermined volume, wherein the computer is programmed so as to leave appropriately cross-sectioned briquettes of inadequate length, collecting, aligning and joining the briquettes by ice welding end to end to from a continuous length of briquette material and guillotining the briquette material into correct length briquettes for feeding into the tooling.

* * * * *